United States Patent
Littau et al.

(10) Patent No.: US 11,629,761 B2
(45) Date of Patent: Apr. 18, 2023

(54) UNIVERSAL JOINT SHAFT WITH UNIVERSAL JOINT SHAFT PROTECTION

(71) Applicant: Walterscheid GmbH, Lohmar (DE)

(72) Inventors: Matthias Littau, Alfter (DE); Martin Hector, Siegburg (DE); Andreas Höck, Lohmar (DE)

(73) Assignee: Walterscheid GmbH, Lohmar (DE)

( * ) Notice: Subject to any disclaimer, the term of this patent is extended or adjusted under 35 U.S.C. 154(b) by 386 days.

(21) Appl. No.: 16/833,891

(22) Filed: Mar. 30, 2020

(65) Prior Publication Data

US 2020/0318690 A1   Oct. 8, 2020

(30) Foreign Application Priority Data

Apr. 2, 2019 (EP) ..................... 19166676

(51) Int. Cl.
| | | |
|---|---|---|
| F16D 3/58 | (2006.01) | |
| F16D 1/08 | (2006.01) | |
| F16D 3/16 | (2006.01) | |
| F16C 3/035 | (2006.01) | |
| F16C 35/02 | (2006.01) | |
| F16D 127/00 | (2012.01) | |

(52) U.S. Cl.
CPC ............. *F16D 3/58* (2013.01); *F16C 3/035* (2013.01); *F16C 35/02* (2013.01); *F16D 1/0835* (2013.01); *F16D 3/16* (2013.01); *F16D 2127/00* (2013.01)

(58) Field of Classification Search
CPC . F16D 3/58; F16D 1/0835; F16D 3/16; F16D 2127/00; F16C 3/035; F16C 35/02
USPC .................. 464/162, 170; 384/296
See application file for complete search history.

(56) References Cited

U.S. PATENT DOCUMENTS

| | | | | |
|---|---|---|---|---|
| 2,465,785 A | * | 3/1949 | Berno | ..................... B60K 17/24 |
| 2,674,330 A | * | 4/1954 | Feil, Jr. | ................... B60K 17/24 |
| | | | | 384/215 |
| 4,236,388 A | | 12/1980 | Geisthoff | |
| 4,338,797 A | | 7/1982 | Herchenbach | |

FOREIGN PATENT DOCUMENTS

| | | |
|---|---|---|
| DE | 305031 C | 1/1920 |
| DE | 851865 C | 10/1952 |
| DE | 2803822 A1 | 8/1979 |
| DE | 2908029 C3 | 12/1982 |
| EP | 3130813 A2 | 2/2017 |
| GB | 687681 A | 2/1953 |
| GB | 1318314 A | 5/1973 |
| GB | 2051998 A | 1/1981 |

OTHER PUBLICATIONS

EPO Search Report for EP19166676 dated Dec. 12, 2019 (8 pages).

* cited by examiner

*Primary Examiner* — Greg Binda
(74) *Attorney, Agent, or Firm* — Bejin Bieneman PLC

(57) ABSTRACT

A universal joint shaft with universal joint shaft protection comprises at least one shaft element for transmitting torque, at least one protective tube element arranged around the shaft element, and an intermediate bearing, by means of which the shaft element is rotatably mounted about an axis of rotation (L) in the protective tube element, wherein the intermediate bearing comprises an outer ring fixed to the protective tube element and an inner ring fixed to the shaft element, which are rotatable relative to each other, and a clamping mechanism by means of which the inner ring is fixed on the shaft element.

8 Claims, 7 Drawing Sheets

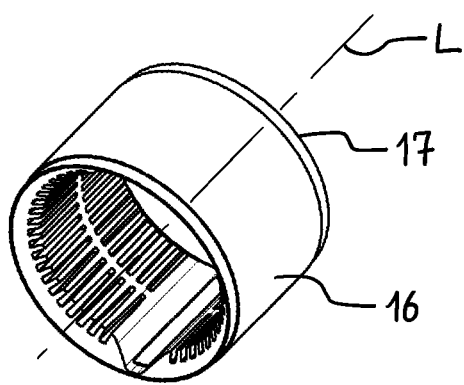
FIG. 10
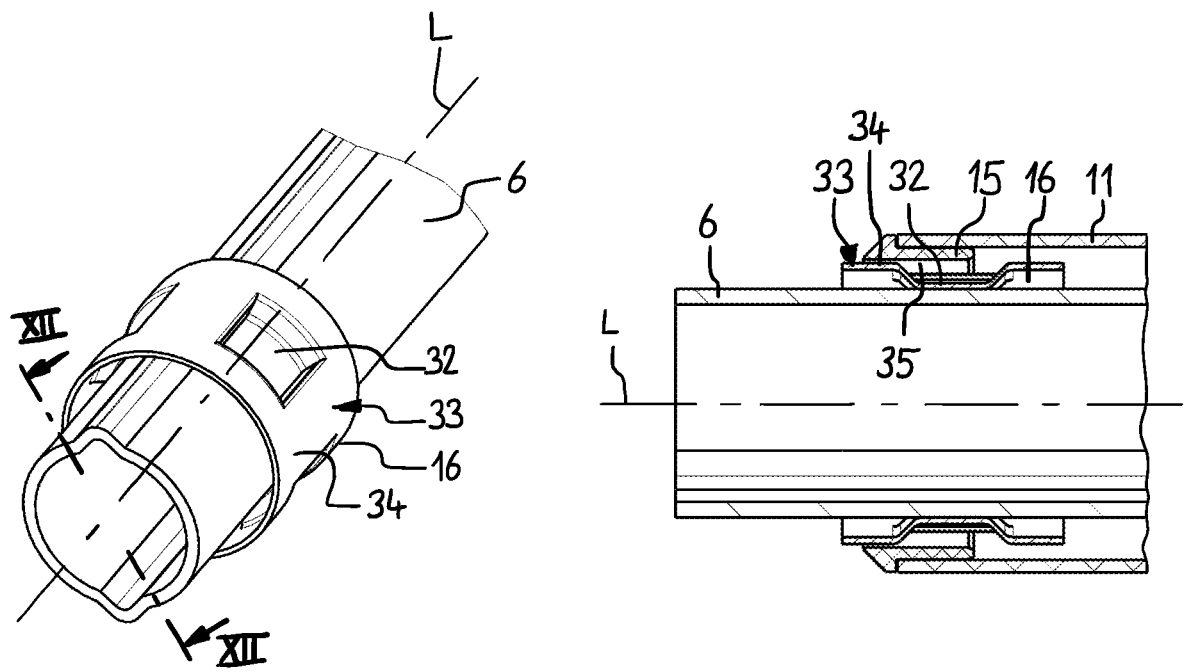
FIG. 11
FIG. 12

UNIVERSAL JOINT SHAFT WITH UNIVERSAL JOINT SHAFT PROTECTION

CROSS-REFERENCE TO RELATED APPLICATIONS

This application is a national stage of, and claims priority to, European Patent Application No. EP 19166676.7, filed on Apr. 2, 2019, which application is hereby incorporated herein by reference in its entirety.

BACKGROUND

A universal joint shaft with universal joint shaft protection can comprise at least one shaft element for transmitting torque, at least one protective tube element which is arranged around the shaft element, and an intermediate bearing by means of which the shaft element is rotatably mounted about an axis of rotation in the protective tube element. The intermediate bearing comprises an outer ring that is fixed to the protection tube element and an inner ring that is fixed to the shaft element. The outer ring and inner ring can be rotated relative to each other.

Such a universal joint shaft is known from DE 29 08 029 C3. The outer ring is inserted into an open end of the protection tube element and is fixedly connected to it. The inner ring is seated on the shaft element and welded to it. The outer ring comprises a collar protruding radially inwards and is immersed in a circumferential groove in the inner ring.

A universal joint shaft of similar design is described in DE 28 03 822 A1.

SUMMARY

Disclosed herein is a universal joint shaft with a protective tube element which comprises a simply constructed intermediate bearing for bearing the protective tube element on a shaft element.

According to one aspect, a universal joint shaft with universal joint shaft protection is provided, the universal joint shaft having at least one shaft element for transmitting torque, at least one protective tube element which is arranged around the shaft element, and an intermediate bearing by means of which the shaft element is rotatably mounted about an axis of rotation in the protective tube element. The intermediate bearing comprises an outer ring that is fixed to the protection tube element and an inner ring that is fixed to the shaft element. The outer ring and the inner ring are rotatable relative to each other. Furthermore, the universal joint shaft comprises a clamping mechanism by which the inner ring is fixed to the shaft element.

The clamping mechanism allows easy mounting of the intermediate bearing on the shaft element. There is no need for a costly assembly procedure such as welding, gluing or screwing. The shaft element comprises a constant cross-sectional profile over a considerable portion in the longitudinal direction. By using a clamping mechanism, it is therefore possible to mount the inner ring at any position in the axial direction on the shaft element. Furthermore, it is possible to change or correct the position of the inner ring later by releasing the clamping mechanism again and clamping it again on the shaft element.

In an exemplary embodiment, the clamping mechanism comprises a clamping ring which is connected rotationally fixed to the inner ring and which is clamped onto the shaft element.

The inner ring can be clamped to the clamping ring for a rotationally fixed connection, for example by pressing the inner ring onto the clamping ring. This provides a simple way of making a firm connection between the inner ring and the clamping ring.

In one embodiment, the clamping ring may have a radially protruding first projection at a first axial end, against which the inner ring is supportable in a first axial direction. The first projection can be formed as a circumferential collar. It is also conceivable that the collar does not extend completely around the circumference. Further, there may also be several first projections distributed around the circumference. The first projection serves as a stop during the pressing of the inner ring onto the clamping ring in order to define a defined limitation of the path of the inner ring during pressing onto the clamping ring in the first axial direction (assembly direction).

The clamping ring can have a radially protruding second projection at a second axial end, against which the inner ring is supportable in a second axial direction (disassembly direction). For example, the inner ring is pushed onto the clamping ring starting from the second axial end and passes the second projection. It may be provided that the second projection does not extend completely around the circumference. This allows the clamping ring, partially in the area of the second projection, to deform elastically radially inwards until the inner ring completely passed the second projection. After complete passage of the second projection, it springs back radially outwards to its original position and is seated axially behind the inner ring, so that the inner ring can be supported axially against the second projection in the second axial direction. It is also possible that several second projections are provided, which are distributed around the circumference.

The second projection can be arranged on a radially elastic lug of the clamping ring to facilitate deformation of the clamping ring radially inwards in the area of the second projection. If several second projections are provided, the clamping ring can have a separate lug for each second projection.

In an exemplary embodiment, the clamping ring can be divided over the circumference into several clamping ring elements. For example, the clamping ring can be divided into two clamping ring elements in the form of half shells. These can be connected to each other at a location by a film hinge, so that the clamping ring can be unfolded transversely to the axis of rotation of the universal joint shaft. The individual clamping ring elements can thus move radially to each other, so that they can be clamped onto the shaft element by means of the inner ring without the clamping ring being subjected to excessive elastic stress. Radial clamping is essentially made possible by the pivot movement of the individual clamping ring elements relative to each other.

In another embodiment, the clamping ring comprises two clamping ring elements which are inserted axially into the inner ring from opposite sides. The clamping ring elements each have at least one wedge-shaped portion, viewed in longitudinal section relative to the axis of rotation, which tapers towards the opposite clamping ring element. The two clamping ring elements are inserted into each other in such a way that the wedge-shaped portions of the two clamping ring elements overlap each other. Thus, clamping is achieved by simply inserting the two clamping ring elements into the inner ring.

The wedge-shaped portions of the clamping ring elements can, for example, be formed by lugs which project axially from one base ring towards the opposite clamping ring element.

In a special embodiment it may be provided that the lugs of at least one overlapping pair of lugs each have a rib projecting radially towards the other lug. The rib provides stiffening of the respective flap. Furthermore, the two clamping ring elements cannot be rotated against each other, so that an exact angular position of the two clamping ring elements relative to each other is maintained.

In another embodiment, the clamping ring can be formed by overmolding the inner ring. By overmolding with plastic, the clamping ring is thus formed and at the same time securely connected to the inner ring.

In another embodiment, the inner ring sits directly on the shaft element. The clamping mechanism comprises at least one radially elastic portion of the inner ring, by means of which the inner ring is radially supported against the shaft element. Thus, this embodiment comprises at least one component less than the previous embodiments.

The inner ring can be made of sheet metal material, wherein the radially elastic portion is a radially inwardly projecting stamping in the inner ring. The elastic portions can thus be produced by a simple forming process.

In another embodiment, the inner ring is made of sheet metal material, wherein the clamping mechanism comprises protruding clamping latches inwardly bent from the inner ring, by means of which the inner ring is clamped onto the shaft element.

Another embodiment shows that the inner ring is made of sheet metal. The clamping mechanism here comprises several clamping portions of the inner ring distributed over the circumference, which can be elastically expanded radially to each other, wherein the shaft element is clamped between the clamping portions. The inner ring comprises sliding portions arranged between the clamping portions, which form outer sliding surfaces, with which the inner ring is in contact with an inner sliding surface of the outer ring in a sliding support manner.

In all embodiments, one of the rings, namely the outer ring or the inner ring, can be made of plastic and the other of these rings can be made of metal. This ensures a plastic/metal pairing that is favorable for the friction conditions.

SUMMARY OF THE DRAWINGS

Preferred exemplary embodiments are explained in more detail below using the figures. Herein, FIG. 10 shows a perspective view of an inner ring and a clamping ring of a third embodiment of an intermediate bearing, FIG. 11 shows a perspective view of an inner ring and a clamping mechanism of a fourth embodiment of an intermediate bearing, FIG. 12 shows a longitudinal section along the intersection line XII-XII as shown in FIG. 11.

DETAILED DESCRIPTION

Figure 1:
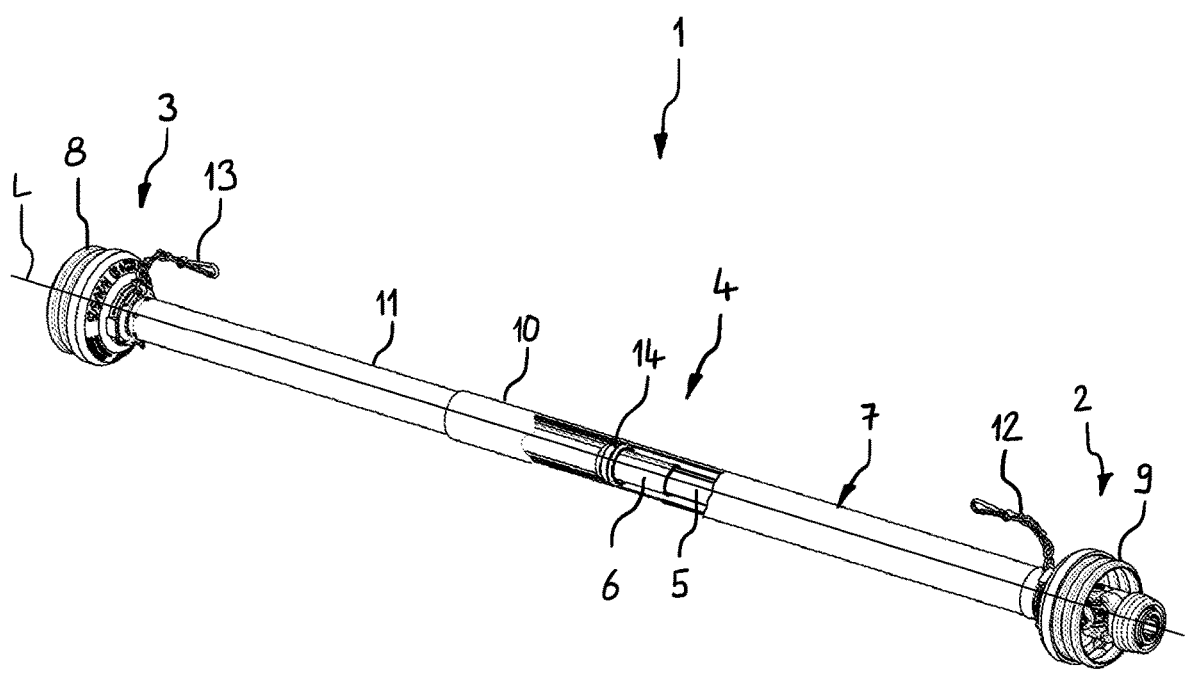
FIG. 1 shows a perspective view of a universal joint shaft with universal joint shaft protection.

FIG. 1 shows a perspective view of a universal joint shaft 1 with a first joint 2 and a second joint 3, which are connected to each other by a shaft 4 variable in length. The first joint 2 and the second joint 3 are formed as cardan joints. The shaft 4 comprises an inner tube 5 connected to the first joint 2 and an outer tube 6 connected to the second joint 3. The inner tube 5 is accommodated in the outer tube 6 moveable axially along a longitudinal axis L of the drive shaft 1. In order to achieve torque transmission between the inner tube 5 and the outer tube 6 when the universal joint shaft 1 rotates about the longitudinal axis L (which is also the axis of rotation), the inner tube 5 and the outer tube 6 each have a cross-sectional profile that deviates from a circular cross-section. In the present case, the inner tube 5 and the outer tube 6 have a so-called lemon profile.

To protect the operating personnel against rotating components, the universal joint shaft 1 comprises a universal joint shaft protection 7. This comprises a first protection cone 8 around the first joint 2 and a second protection cone 9 around the second joint 3. The first protection cone 8 is connected to an outer protective tube 10 in which an inner protective tube 11 is accommodated so as to be axially displaceable along the longitudinal axis L, wherein the inner protective tube 11 is connected to the second protection cone 9. The outer protective tube 10 and the inner protective tube 11 each have a circular cross-section. To ensure that the universal joint shaft protection 7 does not rotate with the joints 2, 3 and the shaft 4, a first safety chain 12 is attached to the first protection cone 8 and a second safety chain 13 to the second protection cone 9. Both safety chains 12, 13 can be connected to stationary components so that the first protection cone 8 and the second protection cone 9 are supported in the direction of rotation.

For long universal joint shafts 1 it is necessary to support the universal joint shaft protection 7 relative to the shaft 4. An intermediate bearing 14, which is arranged between the inner protective tube 11 and the outer tube 6 of the shaft 4, serves this purpose. Different embodiments of the intermediate bearing 14 are explained in more detail by means of the following figures.

Figure 2:
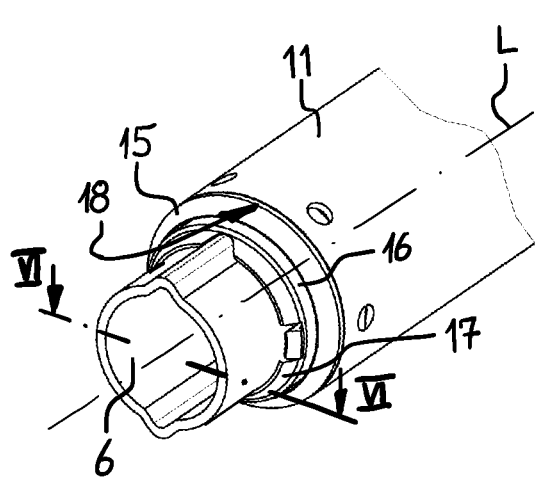
FIG. 2 shows a perspective view of a protective tube element which is rotatably supported on a shaft element of a universal joint shaft by means of a first embodiment of an intermediate bearing.
Figure 3:
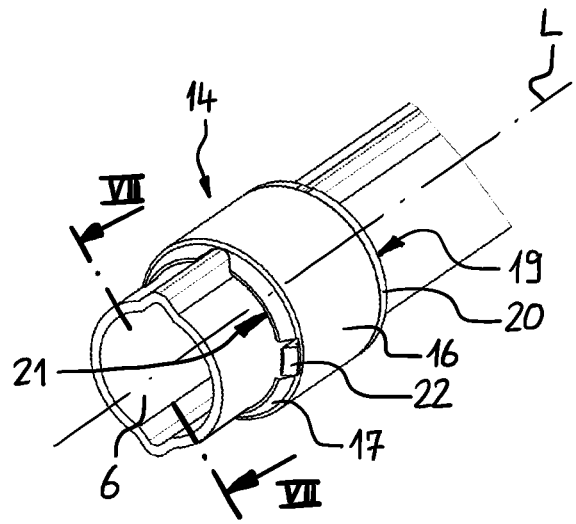
FIG. 3 shows a perspective view according to FIG. 2, wherein the protective tube element is not shown.

FIGS. 2 and 3 show a perspective view of the intermediate bearing 14 on the outer tube 6 of shaft 4 with the inner protective tube 11 (FIG. 2) and without the inner protective tube 11 (FIG. 3).

The outer tube 6 represents a shaft element for the transmission of torque between the first joint 2 and the second joint 3 via the shaft 4. The inner protective tube 11 represents a protective tube element of the universal joint shaft protection, which is arranged around the shaft element in the form of the outer tube 6 of shaft 4. The intermediate bearing 14 is located between the inner protective tube 11 and the outer tube 6. By means of the intermediate bearing 14, the outer tube 6 of the shaft 4 is rotatably mounted inside the inner protective tube 11 so as to be rotatable about the longitudinal axis L, which is also the axis of rotation. The intermediate bearing 14 comprises an outer ring 15, which is attached to an open end of the inner protective tube 11.

Alternatively, the outer ring 15 can also be located at another position within the inner protective tube 11.

Figure 4:
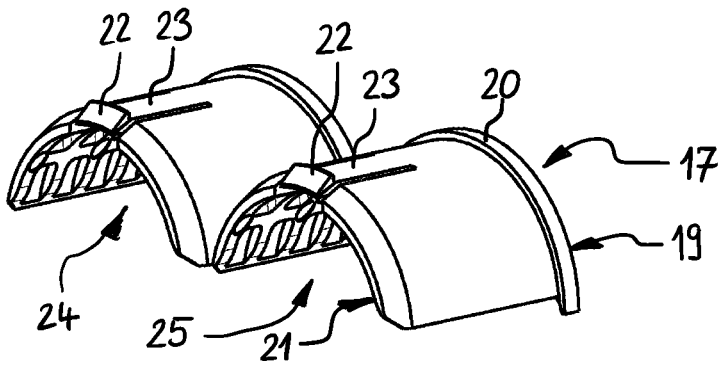
FIG. 4 shows a perspective view of an unfolded clamping ring of the intermediate bearing according to FIGS. 2 and 3.
Figure 5:
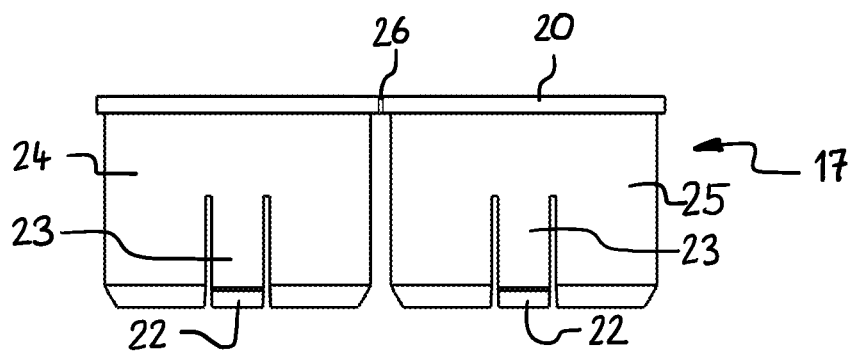
FIG. 5 shows a front view of the unfolded clamping ring as shown in FIG. 3.

The intermediate bearing 14 also comprises a clamping mechanism which, in the embodiment shown, comprises a clamping ring 17. FIGS. 4 and 5 show the clamping ring 17 in different perspectives.

The inner ring 16 is fixed to the outer tube 6 via the clamping mechanism. The clamping ring 17 of the clamping mechanism can be attached to the outer tube 6 at any location along the longitudinal axis L. This means that the inner ring 16 can also be fixed at any location in the axial direction on the outer tube 6.

The clamping ring 17 is connected non-rotatably to the inner ring 16 and clamped non-rotatably onto the outer tube 6. The outer tube 6, like the inner tube 5, comprises a cross-sectional profile that deviates from a circle. In the embodiment shown, the inner tube 5 and the outer tube 6 are formed as lemon profile tubes, which are inserted into each other in a non-rotatable and telescopic manner, so that torque can be transmitted between them. With regard to the inner circumferential surface the clamping ring 17 is adapted to the outer profile of the outer tube 6 and is thus held non-rotatably on it. The inner ring 16 is pressed onto the clamping ring 17 with a press fit in an assembly direction M. Due to the press fit, the inner ring 16 is seated non-rotatably on the clamping ring 17.

Figure 6:
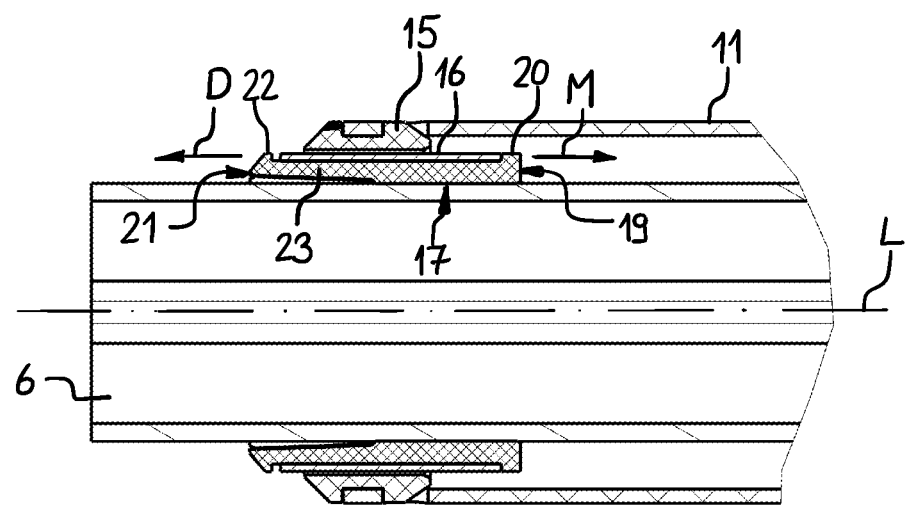
FIG. 6 shows a longitudinal section of the shaft element with protective tube element and intermediate bearing along the intersection line VI-VI according to FIG. 2.
Figure 7:
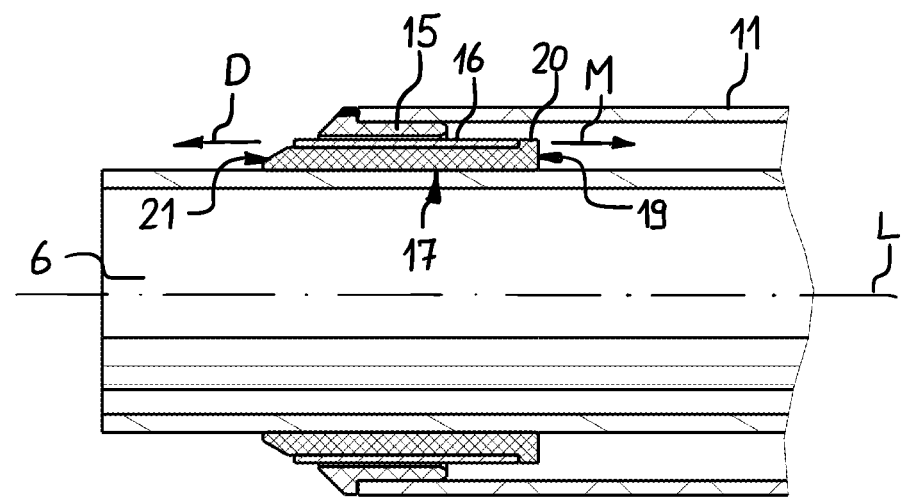
FIG. 7 shows a longitudinal section of the shaft element with protective tube element and intermediate bearing along the intersection line VII-VII according to FIG. 2.

The clamping ring 17 comprises a radially protruding first projection 20 at a first axial end 19, which can also be seen in FIGS. 6 and 7. FIGS. 6 and 7 show different longitudinal sections through the arrangement of the inner protective tube 11, the intermediate bearing 15 and the outer tube 6 of shaft 4.

The inner ring 16 is supportable against the first projection 20 in a first axial direction (assembly direction M). In the embodiment shown, the first projection 20 is formed as a circumferential collar. When the inner ring 16 is pressed onto the clamping ring 17, the first projection 20 serves as a stop to limit the mounting path of the inner ring 16 in the assembly direction M. Alternatively, several first projections 20 can be arranged around the circumference.

The clamping ring 17 also comprises two radially protruding second projections 22 at a second axial end 21. The inner ring 16 is supportable against the second projections 22 in a second axial direction (disassembly direction D). Alternatively, only one second projection 22 or more than two second projections 22 may be provided. The second projections 22 serve to ensure that the inner ring 16 cannot unintentionally be pulled off the clamping ring 17 in the disassembly direction.

In the embodiment shown, the clamping ring 17 comprises two radially elastic lugs 23, on each of which one of the second projections 22 is formed. To disassemble the inner ring 16, the spring lugs 23 must first be pressed radially inwards so that the inner ring 16 can be pulled over the two second projections 22 in the disassembly direction D.

In an exemplary embodiment, the clamping ring 17 is formed divided over the circumference. This is particularly evident from FIGS. 4 and 5. The clamping ring 17 is divided into two clamping ring elements, namely a first clamping ring element 24 and a second clamping ring element 25. The two clamping ring elements 24, 25 are formed half-shell shaped. The two clamping ring elements 24, 25 are hinged together at one circumferential location by means of a film hinge 26. Thus the clamping ring elements 24, 25 can be folded around a hinge axis of the film hinge 26 parallel to the longitudinal axis L. This facilitates mounting on the outer tube 6, as the clamping ring 17 can be placed laterally on the outer tube 6 and then the clamping ring elements 24, 25 can be closed.

Figure 8:
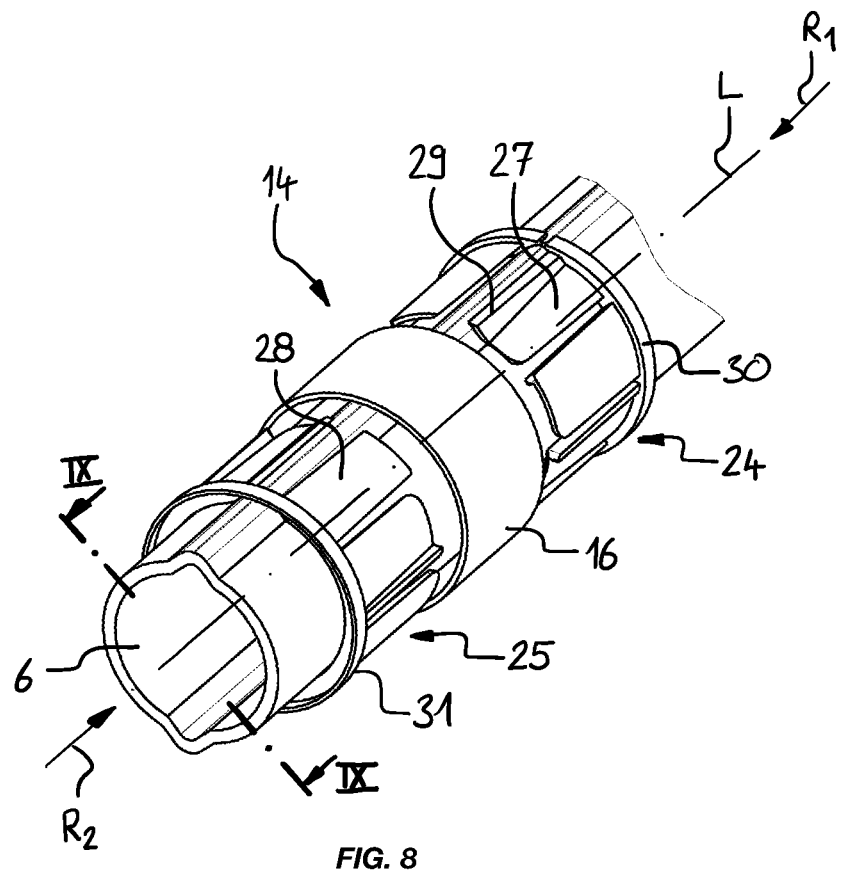
FIG. 8 shows a perspective view of a second embodiment of an intermediate bearing.
Figure 9:
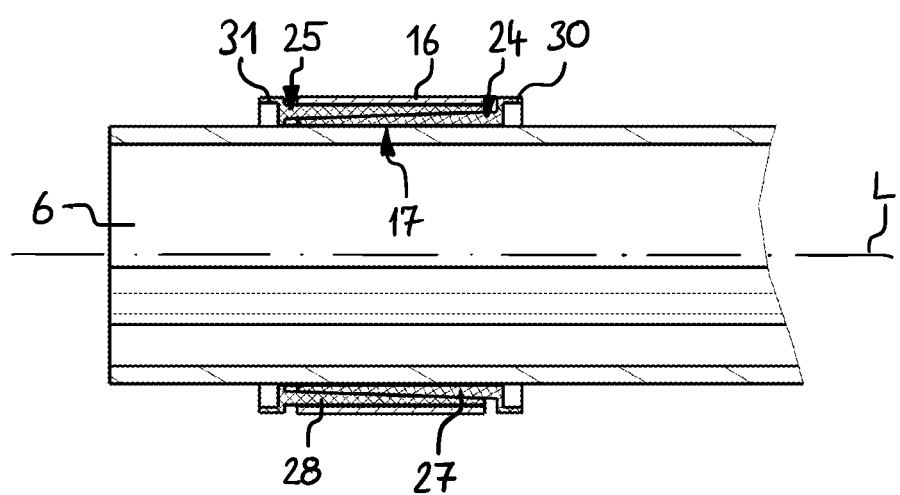
FIG. 9 shows a longitudinal section along the portion line IX-IX as shown in FIG. 8.

FIG. 8 shows a perspective view of a second embodiment of an intermediate bearing 14 on the outer tube 6 of shaft 4. FIG. 9 shows a longitudinal section through the second embodiment of the intermediate bearing 14 and the outer tube 6 along the section line IX-IX according to FIG. 8. FIGS. 8 and 9 are described together in the following, wherein components corresponding to the components of the first embodiment of the intermediate bearing according to FIGS. 2 to 7 are marked with the same reference signs.

The clamping ring 17 of the second embodiment of the intermediate bearing 14 comprises a first clamping ring element 24 and a second clamping ring element 25, which are inserted axially into the inner ring 16 from opposite sides. The first clamping ring element 24 is inserted into the inner ring 16 in a first direction R1. The second clamping ring element 25 is inserted into the inner ring 16 in a second direction R2. The second direction R2 is opposite to the first direction R1, wherein the first direction R1 and the second direction R2 are arranged parallel to the longitudinal axis L.

The first clamping ring element 24 comprises a circumferential base ring 30, from which several lugs 27, distributed over the circumference, project in the direction of the first direction R1. The second clamping ring element 25 also comprises a circumferential base ring 31, from which several lugs 28 distributed over the circumference project in the direction of the second direction R2. The lugs 27, 28 are each wedge-shaped when viewed in a longitudinal section (FIG. 9) and form wedge-shaped portions, each tapering towards the opposite clamping ring element. The lugs 27, 28 are arranged in such a way that two lugs overlap in pairs and are arranged one above the other when viewed in the radial direction. Thus, by inserting the two clamping ring elements 24, 25 into each other, the inner ring 16 is clamped onto the clamping ring 17.

For easy assembly of the two clamping ring elements 24, 25, the base rings 30, 31 can each be divided over the circumference, as can be seen in the first clamping ring element 24 in FIG. 8. The first clamping ring element 24 can thus be expanded and applied radially to the longitudinal axis L on the outer tube 6. For this purpose, the clamping ring elements 24, 25 can also be divided into half-shells, which are connected to each other, for example by a film hinge, so that they can be hinged around a hinge axis arranged parallel to the longitudinal axis.

FIG. 10 shows a perspective view of a clamping ring 17 on an inner ring 16 of a third embodiment of an intermediate bearing. In this embodiment, the clamping ring 17 is formed by partially overmolding the inner ring 16 on its inner side. By overmolding with plastic to produce the clamping ring 17, the clamping ring 17 is securely connected to the inner ring 16.

FIG. 11 shows a perspective view of an inner ring 16 of a fourth embodiment of an intermediate bearing 14 on an outer tube 6. FIG. 12 shows a longitudinal section along the section line XII-XII according to FIG. 11. In this embodiment, the inner ring 16 sits directly on the outer tube 6. The clamping mechanism of the intermediate bearing 14 is formed by several radially elastic clamping portions 32 distributed over the circumference in the form of indentations. The clamping portions 32 clamp the inner ring 16 on the outer tube 6 and are supported in a radial direction against the outer tube 6 for this reason. As shown in the previous embodiments, the outer tube 6 comprises a cross-section deviating from a circle, wherein the clamping portions 32 are supported in the circumferential direction against expansion of the outer tube 6 and thus provide a further protection against rotation in addition to the clamping force.

Furthermore, the inner ring comprises 16 sliding portions 33, which have outward facing outer sliding surfaces 34, which are held in sliding contact with an inner sliding surface 35 of the outer ring 15.

Figure 13:
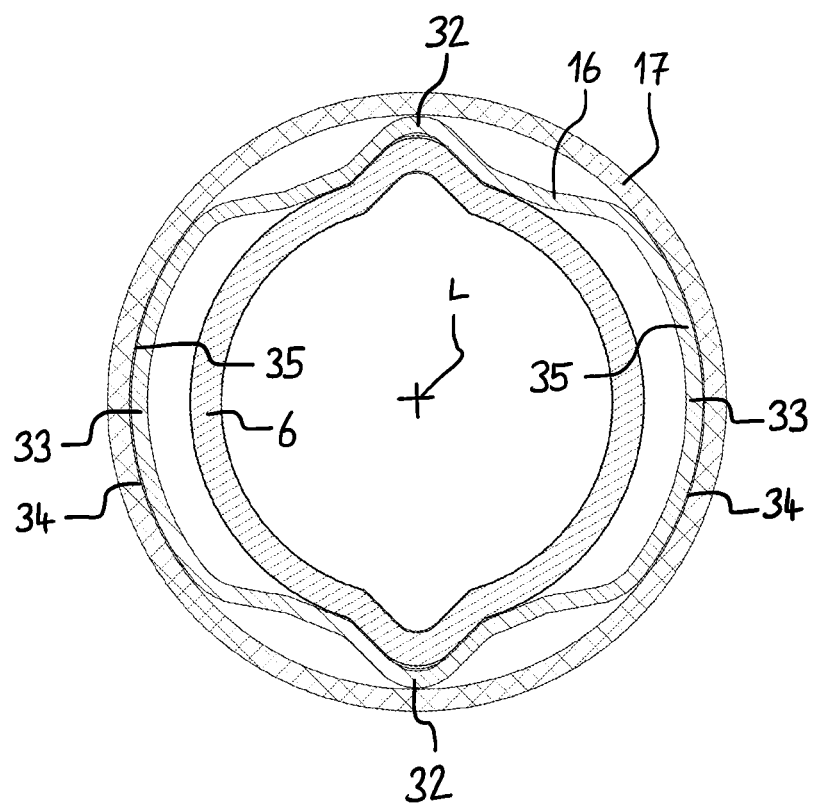
FIG. 13 shows a cross-section of a fifth embodiment of an intermediate bearing.

FIG. 13 shows a cross-section of a fifth embodiment of an intermediate bearing. The inner ring 16 is made of a sheet metal material. The clamping mechanism is formed by two clamping portions 32 distributed around the circumference, which are elastically expandable radially to each other. The outer tube 6 is clamped between the two clamping portions 32, which are arranged diametrically opposite to each other relative to the longitudinal axis L. In addition, the outer tube 6 is designed as a lemon profile, as in the previous embodiments, wherein the clamping portions 32 of the inner ring 16 are clamped onto the outwardly curved portions of the lemon profile. This means that the positive locking also provides protection against rotation of the inner ring 16 on the outer tube 6. Sliding portions 33 are formed between the clamping portions 3, each of which comprises an outer sliding surface 34, which is held in contact with the inner sliding surface 35 of the outer ring 15.

Figure 14:
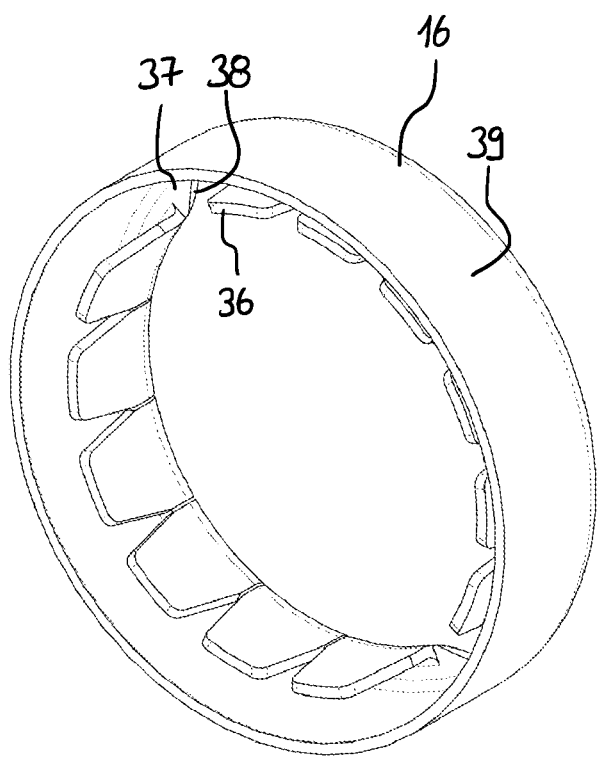
FIG. 14 shows a perspective view of an inner ring with clamping latches of a sixth embodiment of an intermediate bearing.

FIG. 14 shows a perspective view of an inner ring 16 of a sixth embodiment of an intermediate bearing. In this embodiment, the inner ring 16 is made of sheet metal. The clamping mechanism comprises protruding clamping latches 36, which are bent inwards from the inner ring 16 and by which the inner ring 16 is clamped on the shaft element. The clamping latches 36 are arranged on a flange portion 37 of the inner ring 16. The flange portion 37 is bent inwards at one end of a cylindrical portion 39 of the inner ring 16. Inside, the clamping latches 36 are arranged in such a way that they are bent back into the cylindrical portion 39 from the end of the cylindrical portion 39 which comprises the flange portion 37.

The flange portion 37 is provided with two recesses 38, with which the inner ring 16 can be pushed onto the shaft element in a non-rotating manner, e.g. in the form of an outer tube with a correspondingly shaped cross-sectional contour.

The invention claimed is:

1. A universal joint shaft with universal joint shaft protection, comprising:
   at least one shaft element for transmitting torque;
   at least one protective tube element arranged around the shaft element; and
   an intermediate bearing, wherein the shaft element is rotatably mounted by the intermediate bearing about an axis of rotation in the protective tube element, wherein the intermediate bearing includes an outer ring fixed to the protective tube element and an inner ring fixed to the shaft element, wherein the inner ring and outer ring are rotatable relative to each other; and
   a clamping mechanism by which the inner ring is fixed on the shaft element, wherein the clamping mechanism includes a clamping ring that is clamped onto the shaft element, wherein the inner ring is clamped in a radial direction onto an outside of the clamping ring to provide a rotationally fixed connection to the clamping ring.

2. The universal joint shaft according to claim 1, wherein the clamping ring includes a radially protruding first projection at a first axial end, against which the inner ring is supportable in a first axial direction.

3. The universal joint shaft according to claim 2, wherein the clamping ring includes a radially protruding second projection at a second axial end, against which the inner ring is supportable in a second axial direction.

4. The universal joint shaft according to claim 2, wherein the second projection is arranged on a radially elastic lug of the clamping ring.

5. The universal joint shaft according to claim 1, wherein the clamping ring is divided over the circumference.

6. The universal joint shaft according to claim 1, wherein the clamping ring includes two clamping ring elements, which are inserted into the inner ring from opposite sides, wherein the clamping ring elements each have at least one wedge-shaped portion, viewed in a longitudinal section relative to the axis of rotation, which tapers in the direction of the opposite clamping ring element, and wherein the two clamping ring elements are inserted into one another such that the wedge-shaped portions of the two clamping ring elements are arranged overlapping one another.

7. The universal joint shaft according to claim 6, wherein the wedge-shaped portions of the clamping ring elements are formed by lugs which project axially from a base ring in the direction of the opposite clamping ring element.

8. The universal joint shaft according to claim 1, wherein the clamping ring is formed by overmolding the inner ring.

* * * * *